(12) United States Patent
Balasubramanian et al.

(10) Patent No.: US 11,010,025 B2
(45) Date of Patent: May 18, 2021

(54) MULTIPLE PORTABLE CONTROL PANELS IN AIRCRAFT CARGO HANDLING SYSTEM

(71) Applicant: Goodrich Corporation, Charlotte, NC (US)

(72) Inventors: Rameshkumar Balasubramanian, Karnataka (IN); Venkatesan Muthulingam, Karnataka (IN); Naveen Kumar Mallipattana Hiriyannaiah, Bangalore (IN); Sudhendra Nayak, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 121 days.

(21) Appl. No.: 16/164,850

(22) Filed: Oct. 19, 2018

(65) Prior Publication Data

US 2020/0057539 A1  Feb. 20, 2020

(30) Foreign Application Priority Data

Aug. 17, 2018  (IN) .............................. 201811030855

(51) Int. Cl.
| | |
|---|---|
| *G06F 3/0484* | (2013.01) |
| *H04B 17/318* | (2015.01) |
| *G06F 3/147* | (2006.01) |
| *G06F 3/0488* | (2013.01) |
| *G06K 19/07* | (2006.01) |
| *G06K 7/14* | (2006.01) |
| *G06K 7/10* | (2006.01) |
| *G06K 19/06* | (2006.01) |
| *B64D 9/00* | (2006.01) |

(52) U.S. Cl.
CPC ............. *G06F 3/0484* (2013.01); *B64D 9/00* (2013.01); *G06F 3/04886* (2013.01); *G06F 3/147* (2013.01); *G06K 7/10366* (2013.01); *G06K 7/1417* (2013.01); *G06K 19/06037* (2013.01); *G06K 19/0723* (2013.01); *H04B 17/318* (2015.01)

(58) Field of Classification Search
CPC . G06F 3/0484; G06F 3/04886; H04B 17/318; B64D 9/00; G06K 7/10366; G06K 7/1417
USPC ....................................................... 701/23
See application file for complete search history.

(56) References Cited

U.S. PATENT DOCUMENTS

| | | | |
|---|---|---|---|
| 4,006,869 | A | 2/1977 | Vogele |
| 6,328,154 | B1 | 12/2001 | Huber |
| 8,368,531 | B2 | 2/2013 | Staton et al. |

(Continued)

*Primary Examiner* — Peter D Nolan
*Assistant Examiner* — Wae L Louie
(74) *Attorney, Agent, or Firm* — Cantor Colburn LLP

(57) ABSTRACT

Embodiments include techniques for managing multiple portable control panels in aircraft cargo handling system are provided. The embodiments include a master control panel (MCP), and a plurality of wireless coordinators in communication with the MCP. The embodiments also include a plurality of zones of a cargo storage area, wherein each zone of the plurality of zones is defined by a portion of the cargo storage area that is controlled by a wireless coordinator of the plurality of wireless coordinators and includes at least one of power drive units (PDU) and turntables, and a plurality of portable control panels (PCP) in communication with the wireless coordinators, the PCP configured to operate and monitor states of the PDU and turntables.

15 Claims, 13 Drawing Sheets

(56) References Cited

U.S. PATENT DOCUMENTS

| | | | | |
|---|---|---|---|---|
| 8,515,656 B2* | 8/2013 | Reed | .................. | B64D 9/00 |
| | | | | 701/124 |
| 8,622,298 B2* | 1/2014 | Huber | .................. | B64D 9/00 |
| | | | | 235/451 |
| 9,932,112 B1* | 4/2018 | Harms | .................. | B64C 1/20 |
| 10,005,564 B1* | 6/2018 | Bhatia | .................. | B64C 1/22 |
| 2006/0126608 A1* | 6/2006 | Pereira | .................. | H04L 41/0856 |
| | | | | 370/360 |
| 2010/0100225 A1* | 4/2010 | Reed | .................. | B64D 9/00 |
| | | | | 700/213 |
| 2019/0256227 A1* | 8/2019 | Balasubramanian | .................. | |
| | | | | G06F 11/0739 |
| 2019/0384356 A1* | 12/2019 | Balasubramanian | .................. | |
| | | | | G06F 3/0346 |
| 2020/0057539 A1* | 2/2020 | Balasubramanian | .................. | |
| | | | | G06F 3/04886 |
| 2020/0102076 A1* | 4/2020 | Balasubramanian | .... | B64D 9/00 |

* cited by examiner

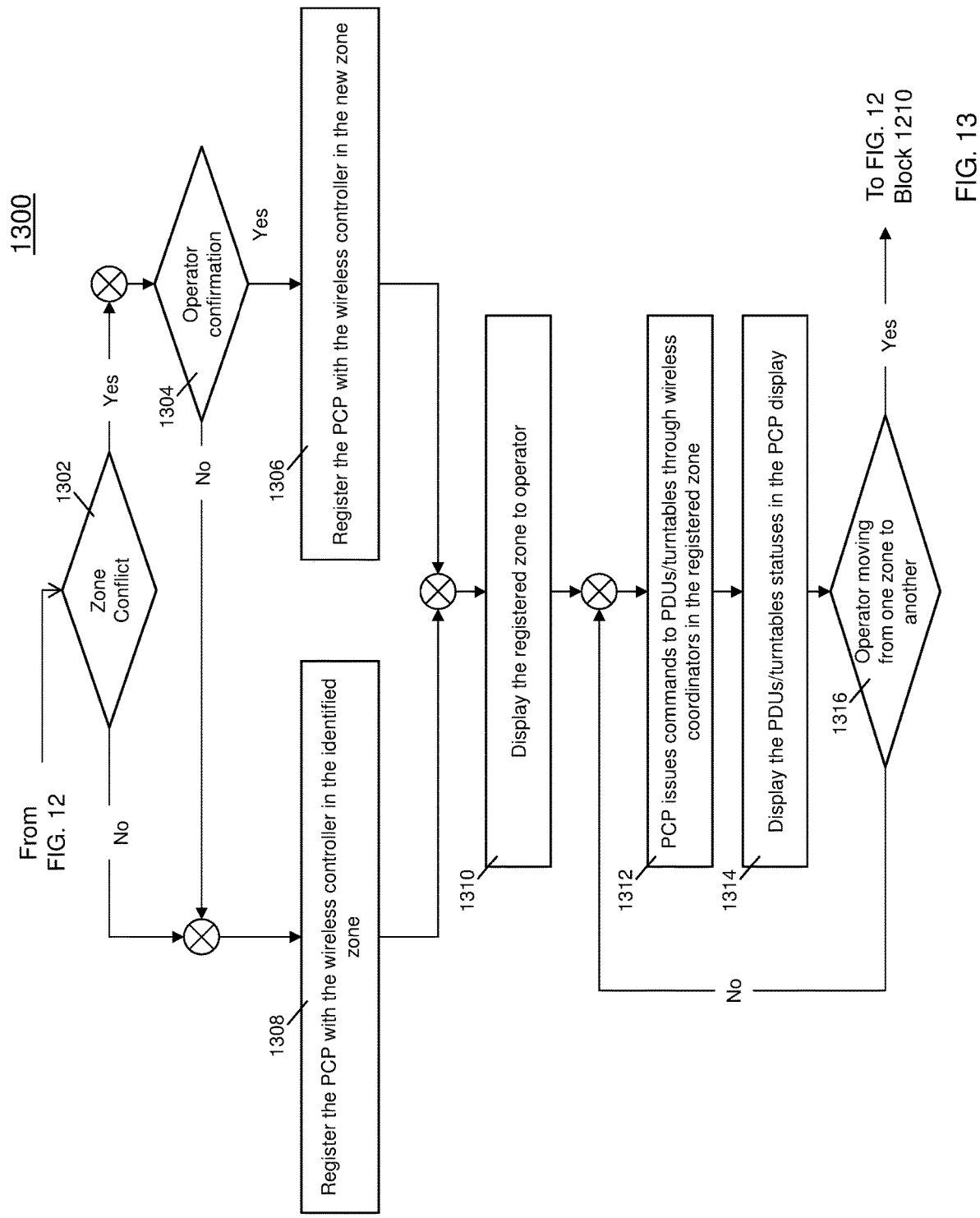

MULTIPLE PORTABLE CONTROL PANELS IN AIRCRAFT CARGO HANDLING SYSTEM

CROSS-REFERENCE TO RELATED APPLICATIONS

This application claims the benefit of Indian Application No. 201811030855 filed Aug. 17, 2018, which is incorporated herein by reference in its entirety

BACKGROUND

The present disclosure generally relates to a system and method for cargo loading management, and more specifically, to managing multiple portable control panels in aircraft cargo handling system.

The items to be shipped by aircraft cargo are generally loaded onto unit load devices (ULDs). The ULDs are specially configured pallets or specially configured containers that are available in various sizes, shapes, and capacities. Once the ULD is loaded, the ULDs are moved in the cargo compartment by power drive units (PDUs) mounted at the floor level at fixed intervals that run the length of the cargo compartment. Upon reaching its final position, the ULD is restrained by means of a mechanical or electro-mechanical restraint system. Turntables can be installed in and forward of the doorway and can steer the ULDs to various positions as needed for in/out, forward/aft, or pallet rotation operations. Multiple ULDs are brought onboard the aircraft and each is placed in its respective stowed position. The PDUs and turntables are hereinafter referred to as line replaceable units (LRUs).

The movement of the ULDs is controlled using a master control panel (MCP) and/or outside control panel (OCP) and/or local control panels (LCPs). The cargo systems provide a dedicated display to enable the operator to monitor the status of ULD position and the status of the cargo LRUs. The MCP provides the control system operation status and cargo system status to cargo maintenance display unit (CMDU). The display unit additionally enables the operator to perform various maintenance operations on the cargo systems. The MCP, OCP, LCPs, and CMDU are referred to as the primary components of the cargo handling system and are permanently fixed to the aircraft.

BRIEF DESCRIPTION

According to an embodiment, a system for managing multiple portable control panels in aircraft cargo handling system is provided. The system includes a master control panel (MCP), and a plurality of wireless coordinators in communication with the MCP. The system also includes a plurality of zones of a cargo storage area, wherein each zone of the plurality of zones is defined by a portion of the cargo storage area that is controlled by a wireless coordinator of the plurality of wireless coordinators and includes at least one of power drive units (PDU) and turntables, and a plurality of portable control panels (PCP) in communication with the wireless coordinators, the PCP configured to operate and monitor states of the PDU and turntables.

In addition to one or more of the features described herein, or as an alternative, further embodiments include a PCP that includes at least one of QR code scanner or radio frequency identifier to perform registering with an aircraft cargo compartment.

In addition to one or more of the features described herein, or as an alternative, further embodiments include registering with an aircraft cargo compartment using at least one of a QR code or RFID or similar techniques.

In addition to one or more of the features described herein, or as an alternative, further embodiments include registering with a zone using a unique key that combines an aircraft tail number and zone identifier.

In addition to one or more of the features described herein, or as an alternative, further embodiments include a plurality of wireless coordinators that are configured to transmit a zone location and time tag.

In addition to one or more of the features described herein, or as an alternative, further embodiments include a PCP that includes a wireless interface to communicate with the wireless coordinators to control each zone.

In addition to one or more of the features described herein, or as an alternative, further embodiments include a plurality of wireless coordinators that are configured to determine a location of the PCP based at least in part on received signal strength indicator (RSSI) based or other trilateration methods.

In addition to one or more of the features described herein, or as an alternative, further embodiments include a PCP that includes a display that is configured to automatically update soft controls available to the PCP based at least in part on a location in the plurality of zones, wherein the soft controls include a soft joystick and one or more soft switches.

In addition to one or more of the features described herein, or as an alternative, further embodiments include a soft joystick that is presented on the display based at least in part on an orientation of an aircraft including the cargo storage area.

According to another embodiment, a method of managing multiple portable control panels in aircraft cargo handling system is provided. The method includes associating a key to perform registration, and determining a location of the portable control panel (PCP) based on a plurality of wireless coordinators and the key. The method also includes registering a PCP to a zone of a plurality of zones of a cargo storage area based on the plurality of wireless coordinators, wherein each zone of the plurality of zones is defined by a portion of the cargo storage area that is controlled by a wireless coordinator of the plurality of wireless coordinators, and controlling at least one of power drive units (PDUs) or turntables of the zone.

In addition to one or more of the features described herein, or as an alternative, further embodiments include detecting, by the plurality of wireless controllers, the movement of the PCP, and responsive to the movement, determining at least one of a zone change or a zone conflict.

In addition to one or more of the features described herein, or as an alternative, further embodiments include responsive to determining the zone change, performing a detection of other actively engaged PCPs in the zone, and completing registration based on at least in part on the detection.

In addition to one or more of the features described herein, or as an alternative, further embodiments include responsive to determining a zone conflict, providing a prompt to select a zone, and completing the registration based on the selected zone.

In addition to one or more of the features described herein, or as an alternative, further embodiments include registering the PCP using at least one of a QR code or RFID.

In addition to one or more of the features described herein, or as an alternative, further embodiments include a key that combines an aircraft tail number and zone identifier.

In addition to one or more of the features described herein, or as an alternative, further embodiments include transmitting, by the plurality of wireless coordinators, a zone location and time tag to the PCP.

In addition to one or more of the features described herein, or as an alternative, further embodiments include determining the location of the PCP is based at least in part on received signal strength indicator (RSSI) based or similar trilateration of the plurality of wireless coordinators.

In addition to one or more of the features described herein, or as an alternative, further embodiments include responsive to a zone change, automatically updating soft controls presented on a display of the PCP based at least in part on the zone change.

In addition to one or more of the features described herein, or as an alternative, further embodiments include updating a soft joystick and one or more soft switches of the display based on a zone location of the PCP.

In addition to one or more of the features described herein, or as an alternative, further embodiments include updating a direction of the soft joystick based at least in part on an orientation of an aircraft including the cargo storage area.

BRIEF DESCRIPTION OF THE DRAWINGS

The following descriptions should not be considered limiting in any way. With reference to the accompanying drawings, like elements are numbered alike:

FIG. 13 depicts another flow diagram for using multiple portable control panels in the aircraft in accordance with one or more embodiments.

DETAILED DESCRIPTION

The fixed nature of control panels and display unit causes the operator to be stuck near the location of the control panels and the display unit. This limits the operator to have a broader visibility of the cargo loading/unloading process, inhibits from moving and more importantly poses safety concerns.

The techniques described herein propose implementing the functionality of the control panels on portable electronic devices which interact through the wireless interface to perform various cargo operations. The techniques described herein provide for operating the portable control panel (PCP) to replace the local control panel and/or the outside control panel of the cargo handling systems.

Figure 1:
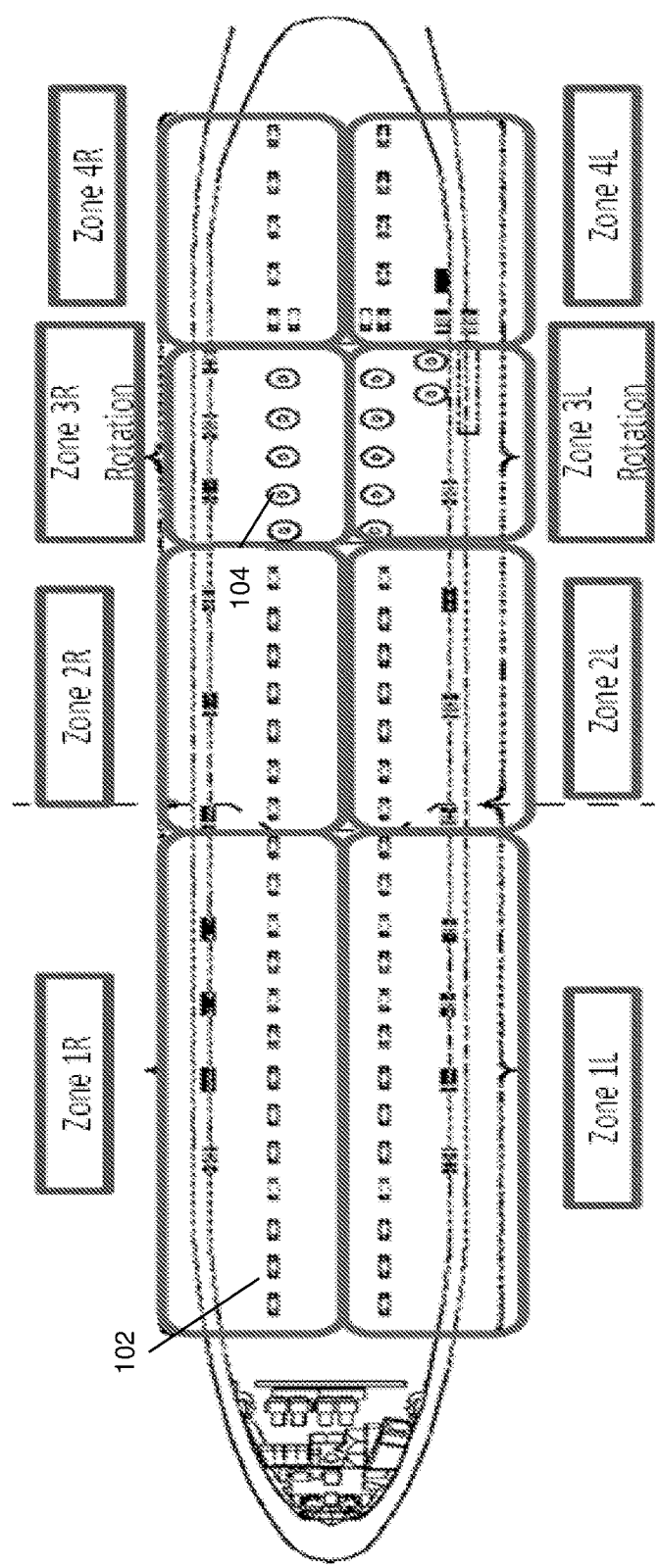
FIG. 1 depicts an aircraft cargo compartment in accordance with one or more embodiments.

Turning now to FIG. 1, an aircraft cargo compartment 100 in accordance with one or more embodiments is shown. The cargo compartment 100 is divided into several zones, such as zones 1R, 1L, 2R, 2L, 3R, 3L, 4R, and 4L, for storing cargo and each zone can be configured with different equipment. For example, zones can be configured with power drive units (PDUs) 102 or turntables 104 or a combination of both. As shown, each zone can be a different size and/or shape and can also include different number of PDUs and/or turntables.

Figure 2:
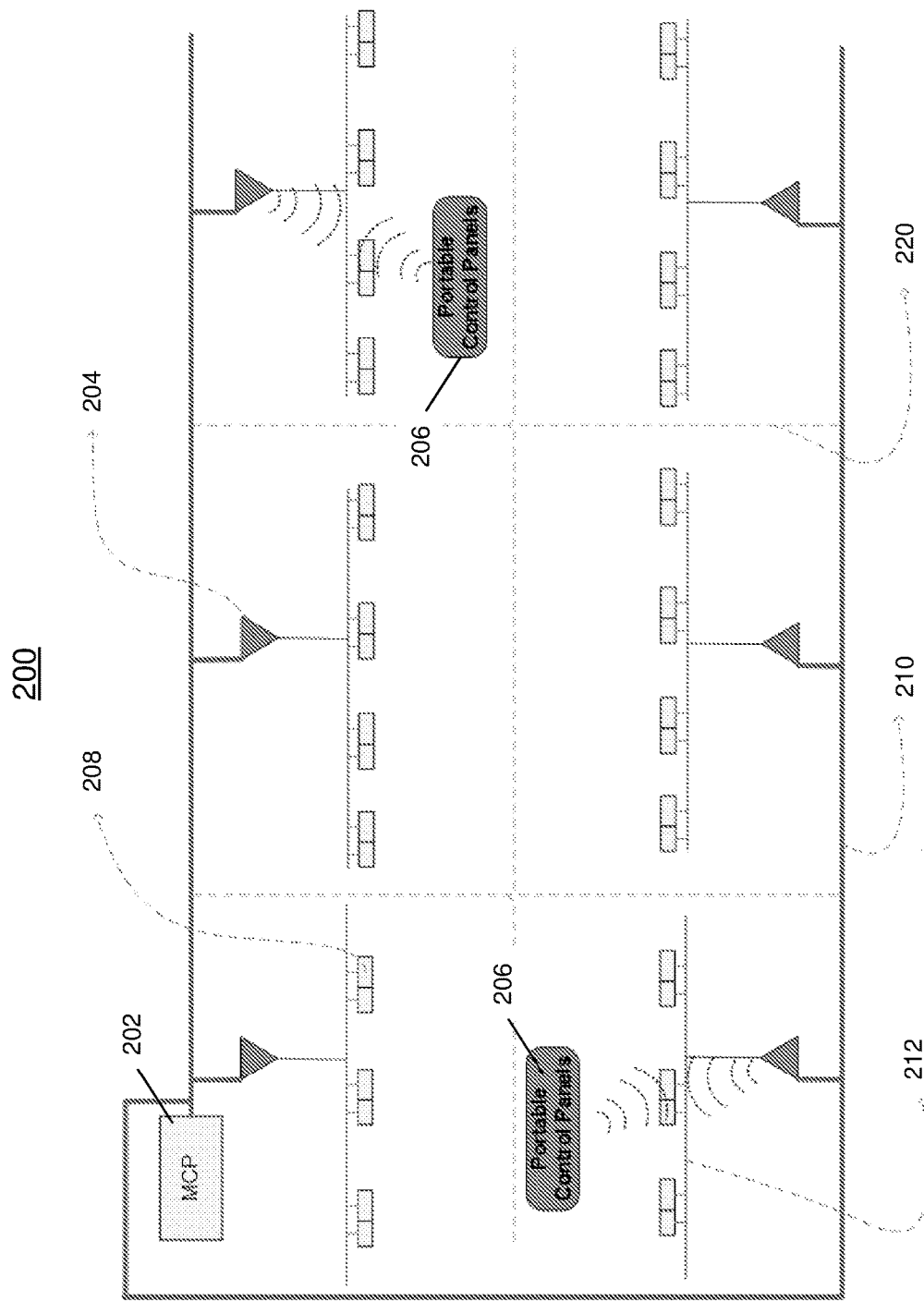
FIG. 2 depicts a system for managing multiple portable control panels (PCPs) in aircraft cargo handling system in accordance with one or more embodiments.

Now referring to FIG. 2, a control system 200 operating in the cargo compartment of FIG. 1 in accordance with one or more embodiments is shown. The MCP 202 is coupled to the plurality of wireless coordinators 204. In one or more embodiments, the MCP 202 is in communication with the wireless coordinators 204 over a wired/wireless connection 210. The wireless coordinators 204 are connected to one or more PDUs/turntables in a particular zone. Each zone can have a different configuration including a different number of PDUs/turntables and others wherein the PDUs and turntables are in communication with the wireless coordinators 204 through connections 212. The PCPs 206 as shown in FIG. 2 are operating independently of each other in different zones as indicated by the dividers 220.

Figure 3:
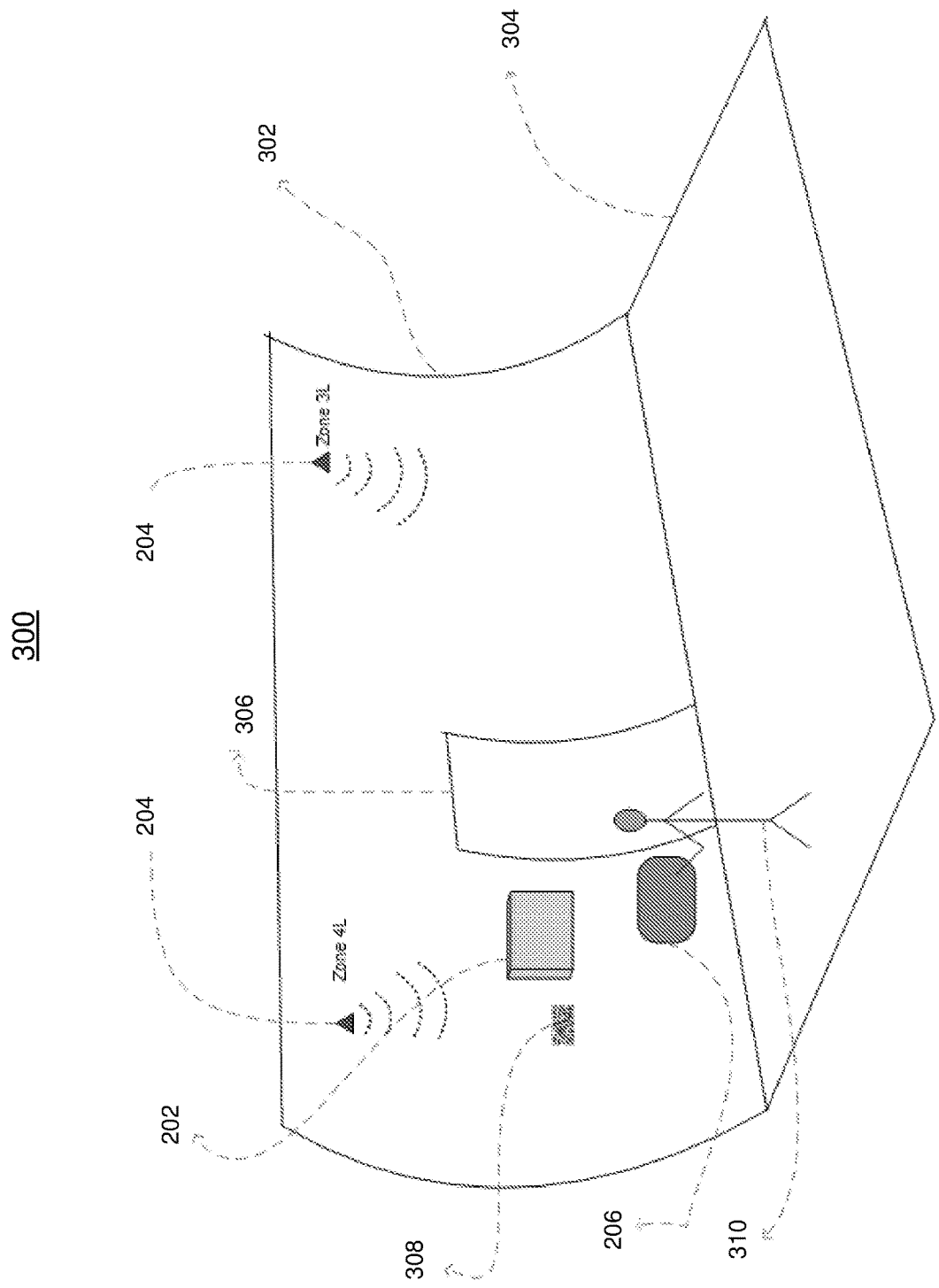
FIG. 3 depicts an entrance to an aircraft cargo compartment in accordance with one or more embodiments.

Now referring to FIG. 3, an entrance 300 to an aircraft cargo compartment is shown. As illustrated in FIG. 3, the main deck wall 302 includes the MCP 202 and the QR code 308. An operator 310 standing on the main deck floor 304, carrying the PCP 206 towards the main deck door 306 to register the PCP 206 before entering the compartment. The PCP 206 scans the QR code 308 to register the device in the particular aircraft cargo compartment so the PCP 206 can communicate with the wireless coordinators 204 included in the aircraft cargo compartment.

Responsive to performing a successful registration, the PCP 206 synchronizes its time with the MCP 202 and zone identifiers. The wireless coordinators 204 located in each zone of the aircraft cargo compartment act as zone identifiers. The wireless coordinators 204 are configured to transmit the zone location and time tag information continuously through which the PCP 206 can identify the zone in which it is located and synchronize the time.

The PCP 206 is configured to issue commands to the PDUs/turntables through the wireless coordinators 204. Each wireless command from the PCP 206 carries the aircraft tail number to avoid conflicting with other adjacent aircraft. At any given time, the identification of the zone where the PCP 206 is currently located within the cargo compartment is performed through a received signal strength indicator (RSSI) based trilateration or similar techniques.

Figure 4:
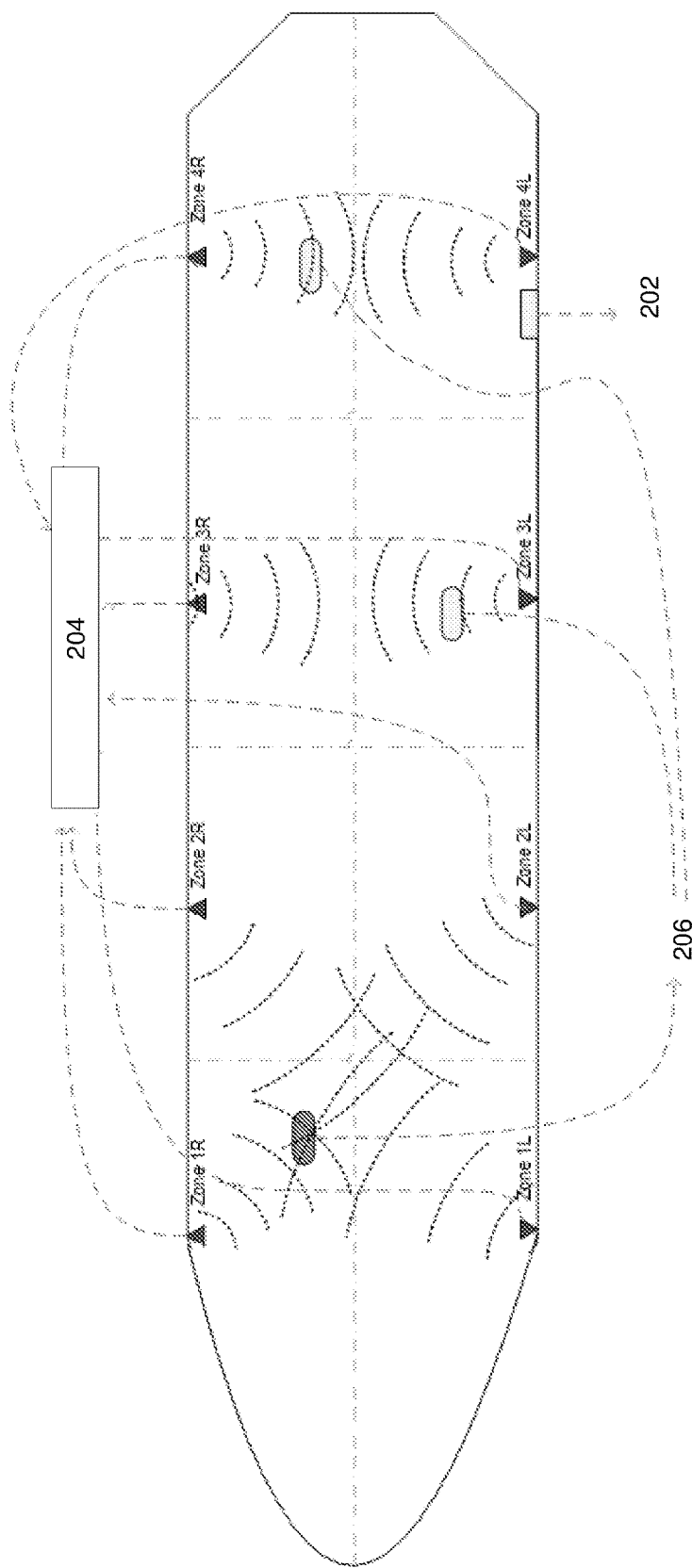
FIG. 4 depicts a PCP in the aircraft cargo compartment in accordance with one or more embodiments.
Figure 5:
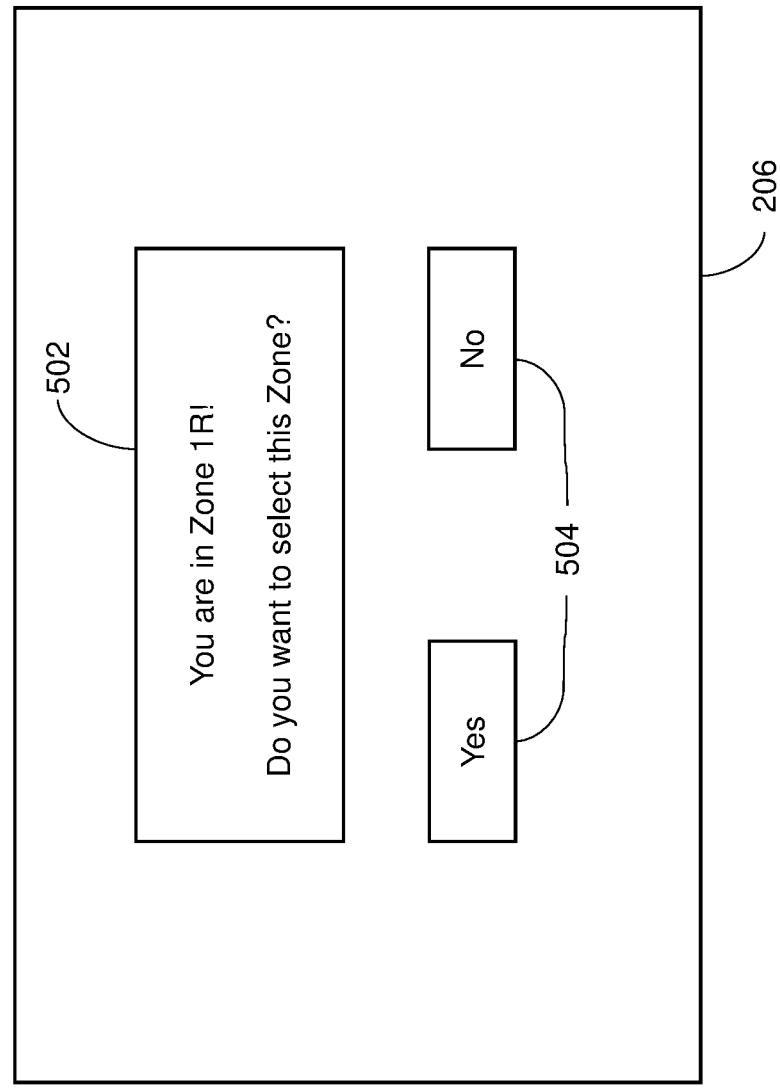
FIG. 5 depicts an operator interface of the PCP in accordance with one or more embodiments.

As shown in FIG. 4, the PCP 206 is located in zone 1R. Responsive to identifying the zone, an application running on the PCP 206 displays the current zone to the operator providing the operator the option of registering to the identified zone based on his/her position. As shown in FIG. 5, an indication 502 is provided to the PCP 206 to communicate the current zone location information. The operator can accept/decline to register to the indicated zone using the zone selection soft buttons 504.

Figure 6:
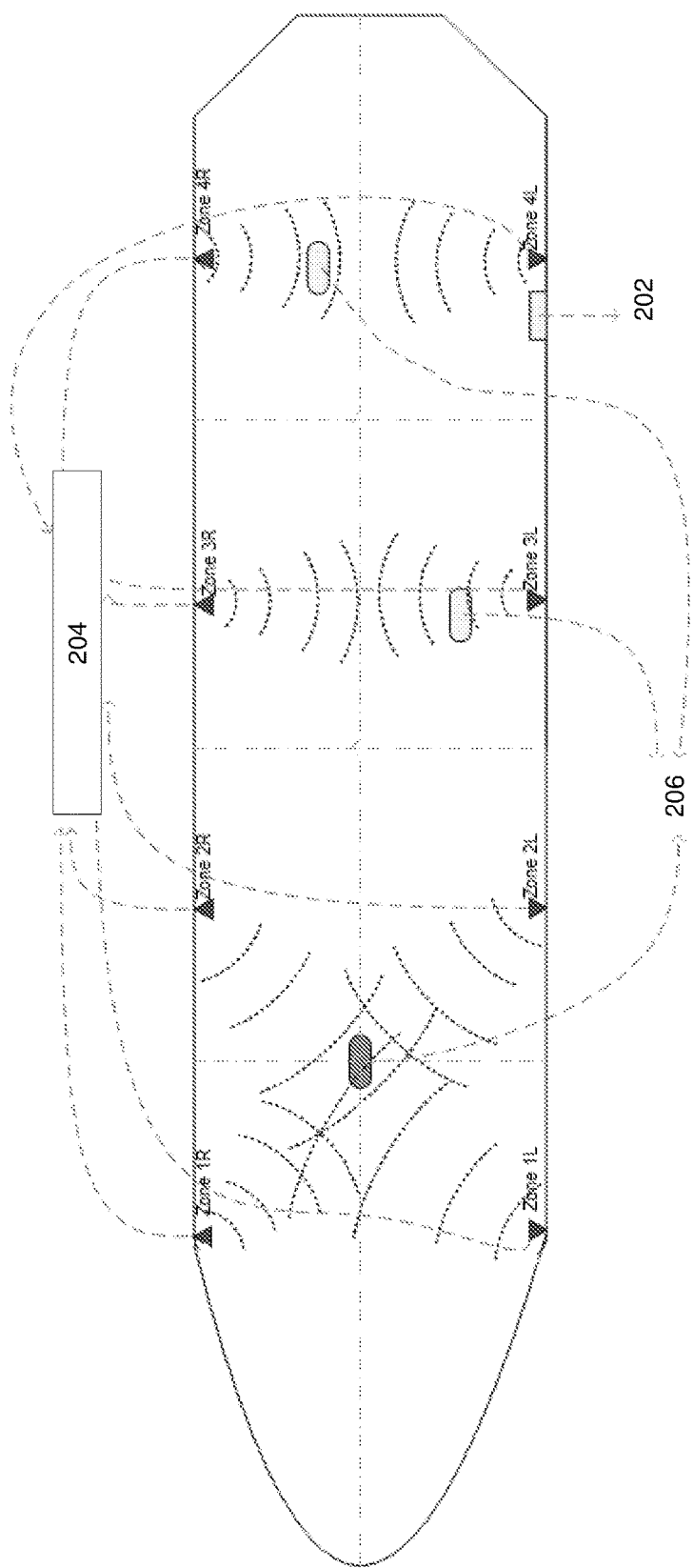
FIG. 6 depicts a PCP in the aircraft cargo compartment in accordance with one or more embodiments.
Figure 7:
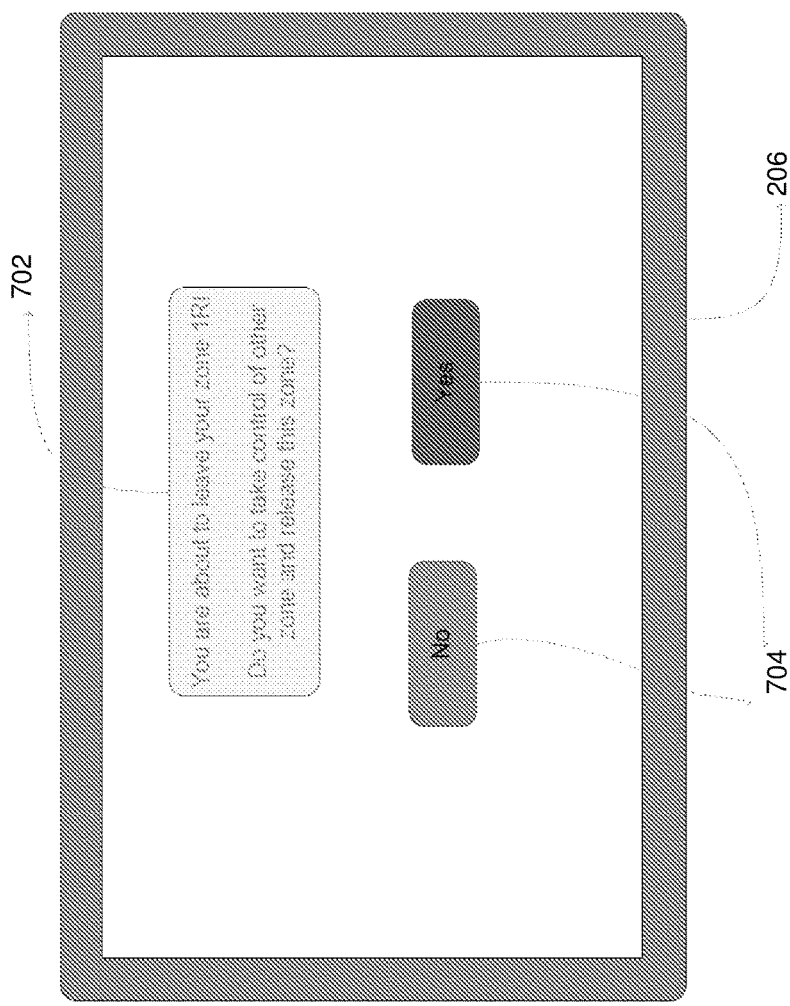
FIG. 7 depicts an operator interface of the PCP in accordance with one or more embodiments.

In FIG. 6, the cargo compartment diagram 600 illustrates zone conflict where the PCP 206 is equidistance between two or more zones. In this scenario, the PCP 206 will not be able to register with either of the zones. The conflict can be automatically detected and the operator can be notified through an interactive voice and/or textual message. The operator can make the selection whether to maintain control of a current zone or switch control to a different zone. As shown in FIG. 6, the PCP 206 is located at an equal distance to the wireless coordinators 204 for zones 1R, 2R, 1L, and 2L. In FIG. 7, the display 700 of PCP 206 can provide an indication 702, indicating a zone change, to the operator. The operator can accept/decline to register to the indicated zone using the zone selection soft buttons 704.

Figure 8:
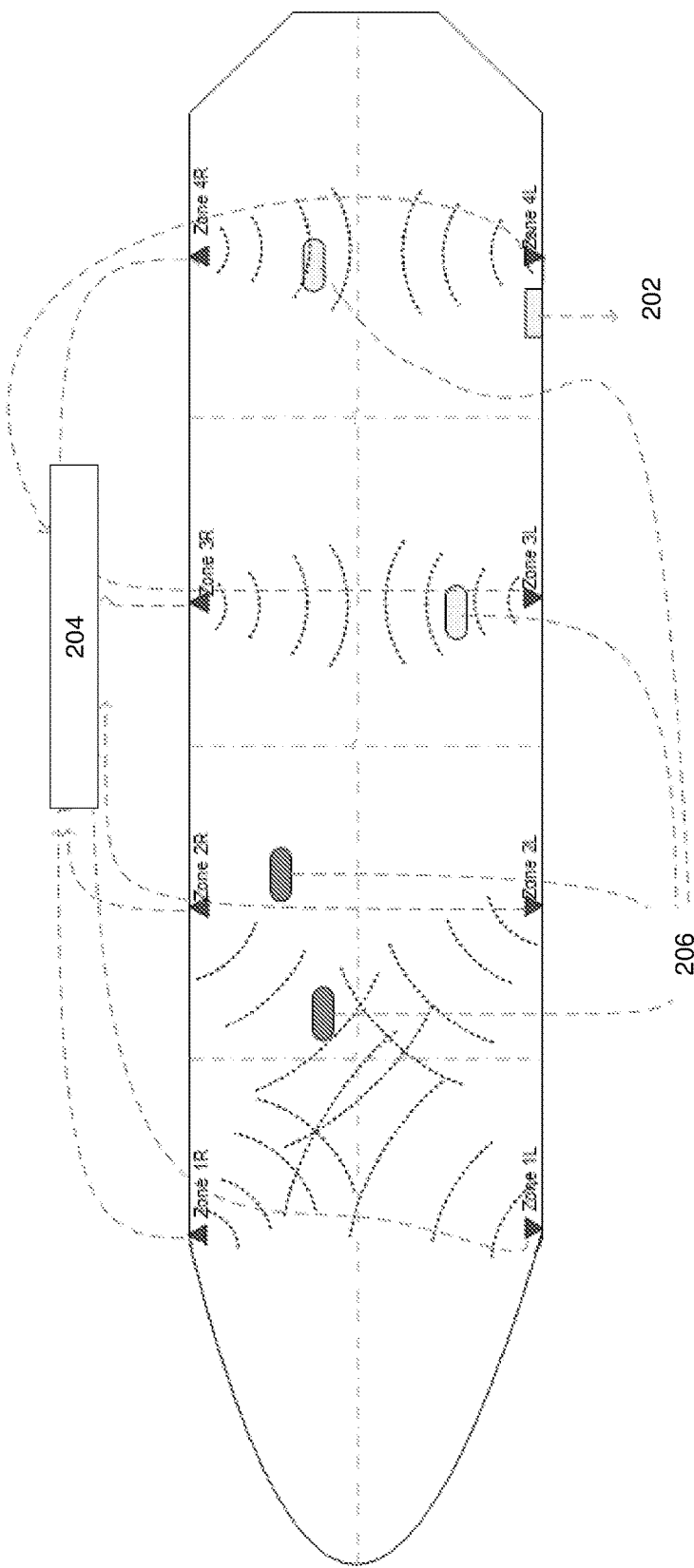
FIG. 8 depicts multiple PCPs in the aircraft cargo compartment in accordance with one or more embodiments.
Figure 9:
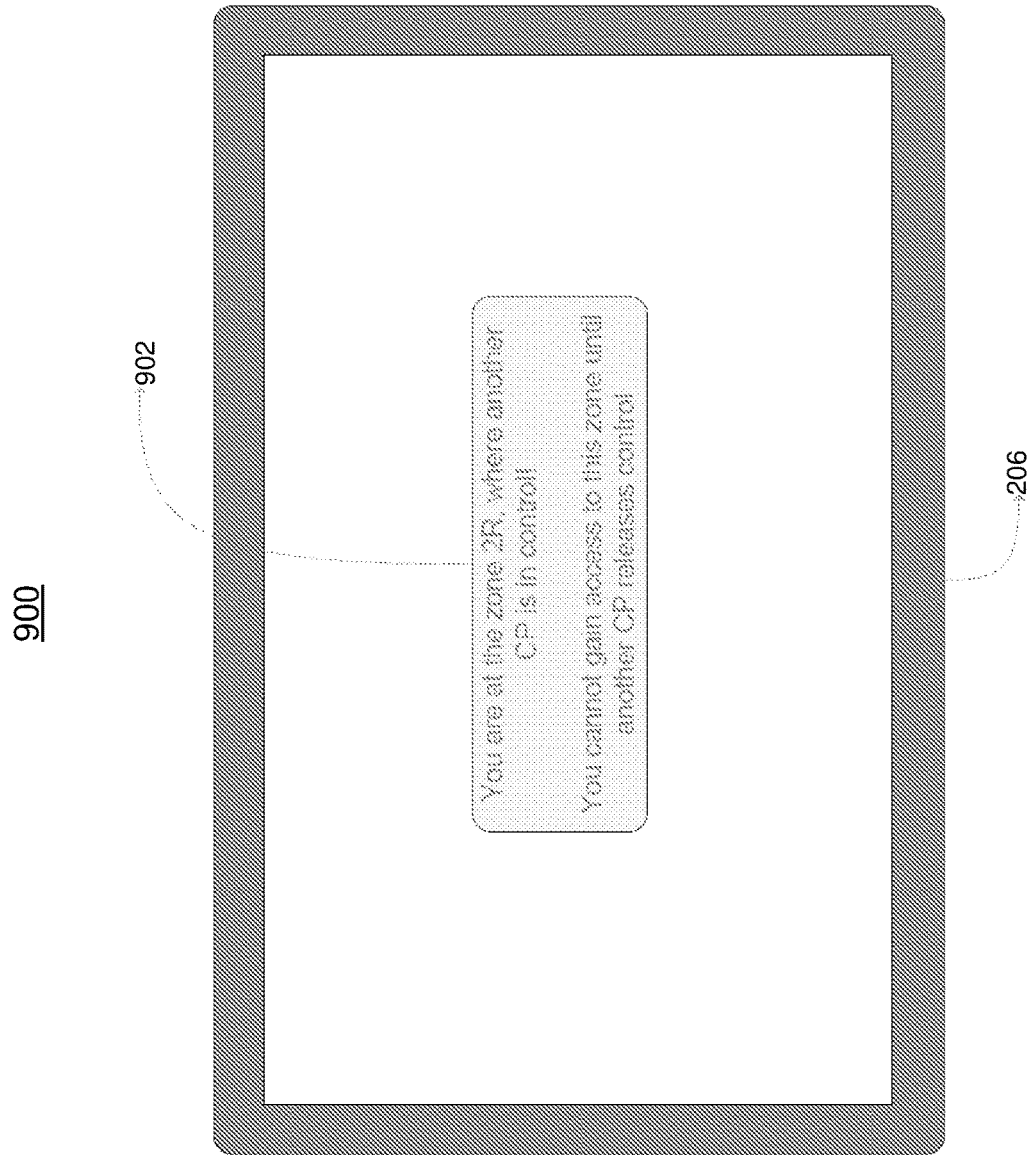
FIG. 9 depicts an operator interface of the PCP in accordance with one or more embodiments.

In FIG. 8, the cargo compartment diagram 800 illustrates a technique for resolving conflict when multiple PCPs 206 are actively engaged in a single zone. As shown in FIG. 8, the PCP 206 has moved into the zone 2R where another PCP is actively engaged. The conflict is automatically identified and notified to the operator as shown in FIG. 9. The display 900 of the PCP 206 provides an indication 902 indicating multiple PCPs 206 in a cargo compartment.

Figure 10:
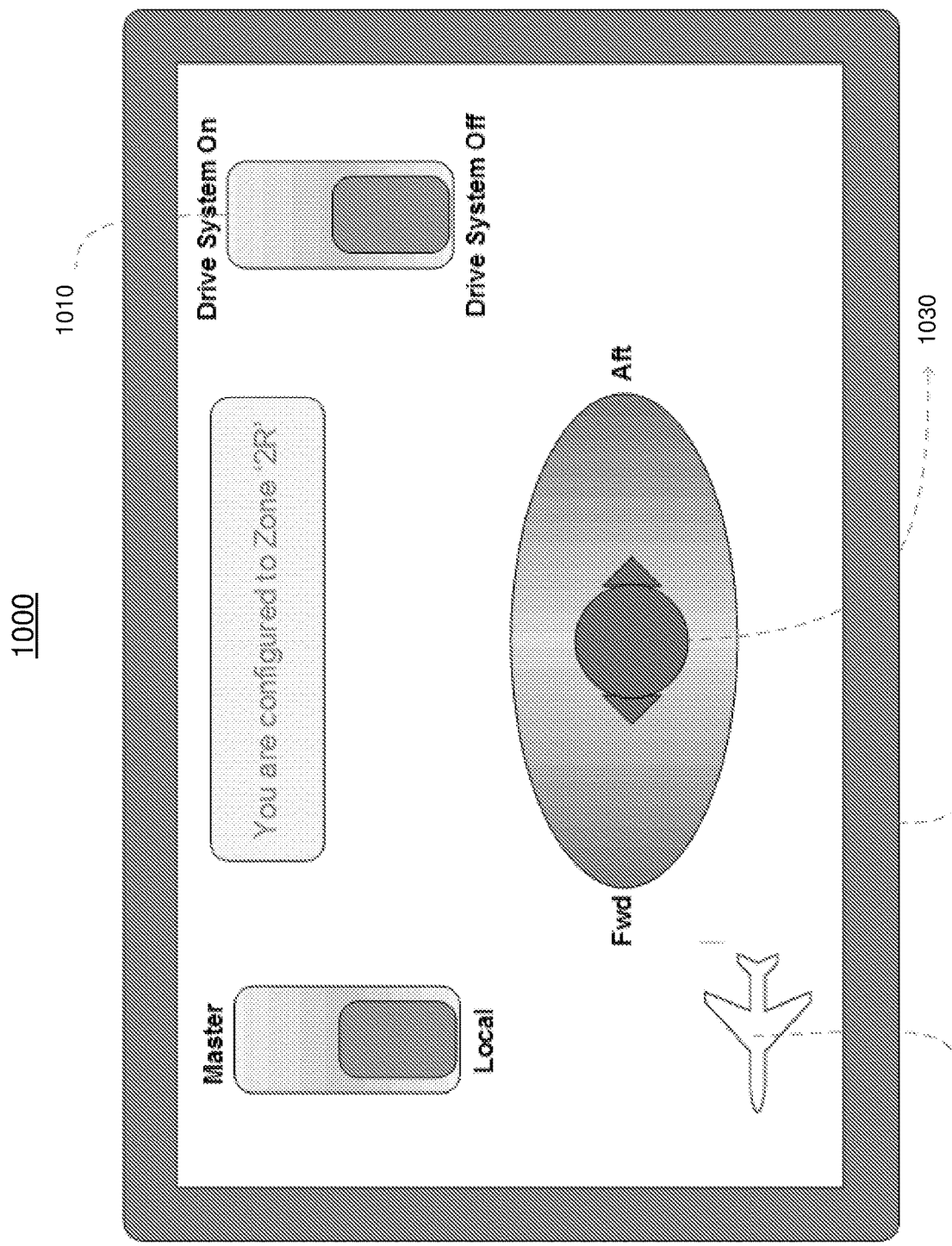
FIG. 10 depicts soft controls for a zone in accordance with one or more embodiments.
Figure 11:
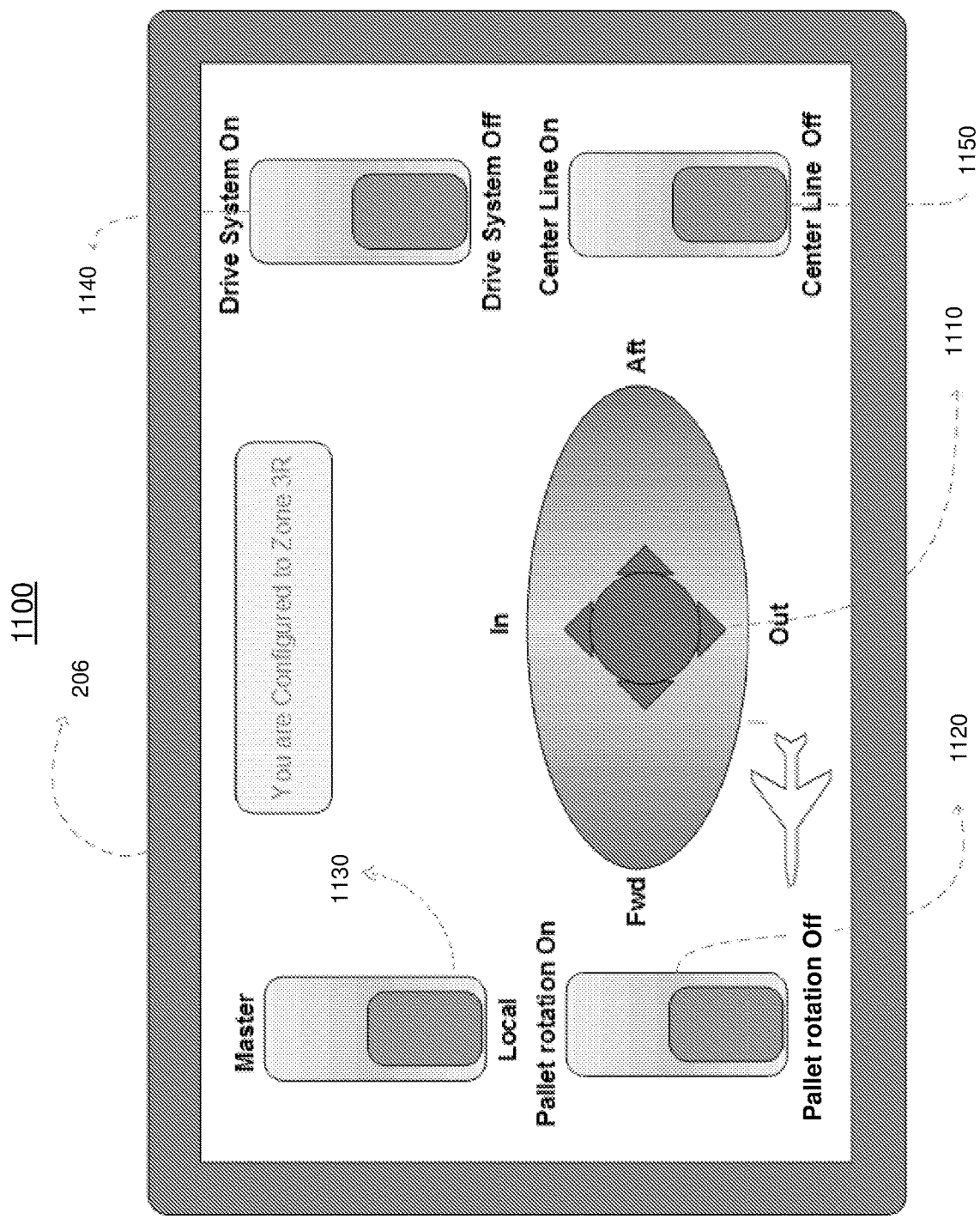
FIG. 11 depicts soft controls for a different zone with rotation and centerline control enabled in accordance with one or more embodiments.

FIGS. 10 and 11 illustrate non-limiting examples of the displays presented to an operator using the PCP 206 that is based on the current zone location of the PCP 206. The PCP is configured to execute various cargo operations such as cargo handling, monitoring and fault diagnostics, etc. to be performed independently and seamlessly without much manual coordination between operators. The hardware control switches and joysticks of OCP and LCP are implemented as soft switches and joysticks on the PCP display as shown in FIGS. 10 and 11. The configuration of the soft switches and soft joysticks 1030 are automatically configured/updated based on the detected zone in which the PCP 206 is currently located. As shown in FIG. 10, an example PCP display 1000 of a PCP 206 located in zone 2 is shown. The PCP display can present the operator with options to configure the PCP 206 in a master mode or a local mode. In addition, there are controls for the PDU where the drive system switch 1010 can be switched ON/OFF to control the PDU. The aircraft heading 1020 can also be presented to the operator. In one or more embodiments, the controls are updated and presented on the PCP display based on the zone the PCP 206 is currently located in and based on the PCP 206 orientation in accordance with the aircraft heading.

As shown in FIG. 11, an example PCP display 1100 of a PCP 206 locating in zone 3 of the aircraft cargo compartment is shown. The soft joystick 1110 provides the ability to move the cargo ULD in all four directions forward (fwd), aft, left, and right. The soft switches 1120 provide the ability to rotate the ULD in zone 3. The soft switches 1130 provide the ability to configure the PCP 206 in a master/local mode of operation. The soft switches 1140 provided the ability to control the PDU drive system and soft switch 1150 controls the center line PDUs. The display also provides an indication of the current orientation of the PCP 206 relative to the direction of the aircraft. In addition, the soft joystick 1110 will align itself based on the operator's position towards the left, right, aft or forward cargo/aircraft walls.

Figure 12:
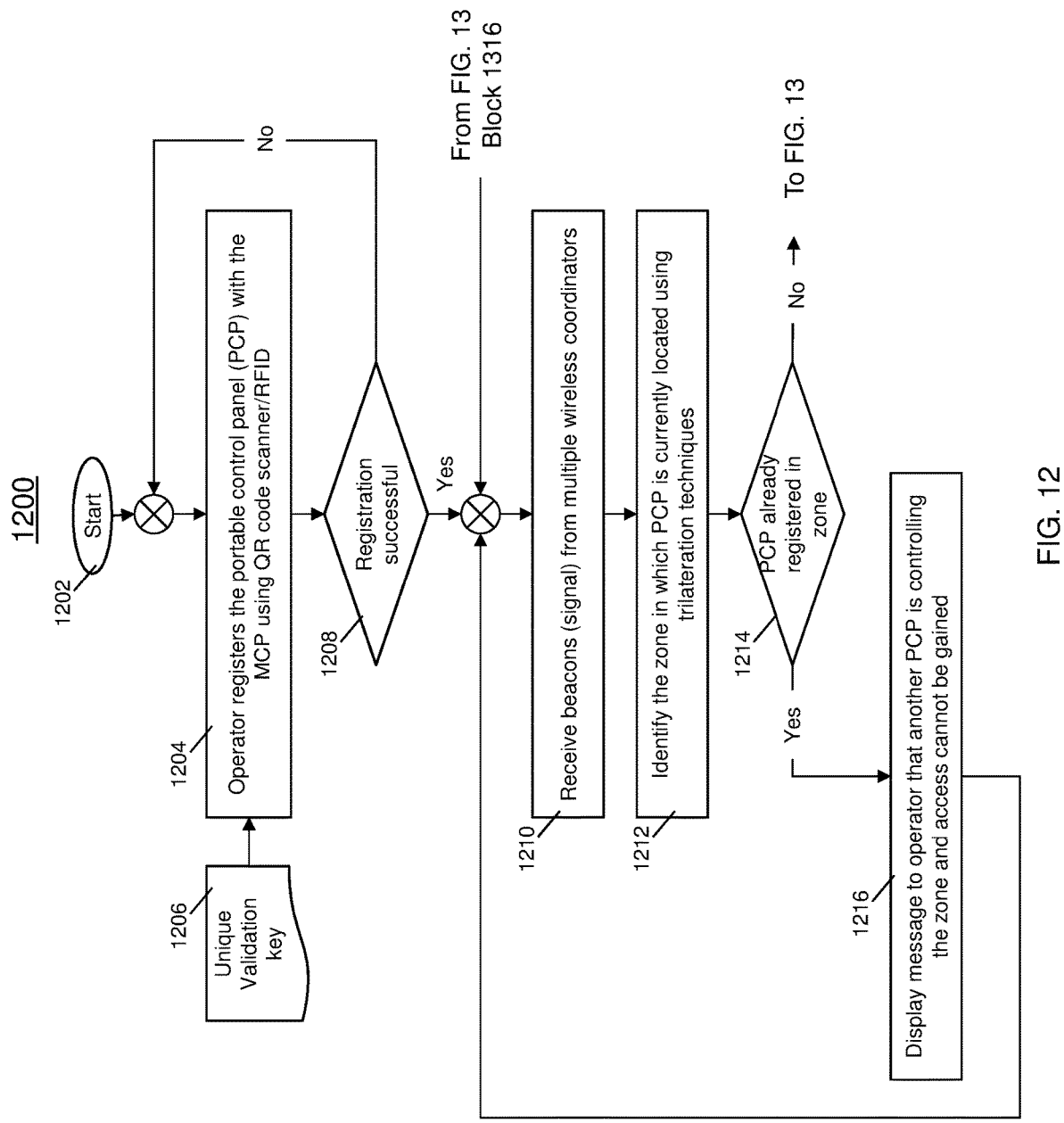
FIG. 12 depicts a flow diagram for using multiple portable control panels in the aircraft in accordance with one or more embodiments.

Now referring to FIG. 12, a flow diagram of a method 1200 in accordance with one or more embodiments is shown. The method 1200 begins at block 1202 and proceeds to block 1204 which includes registering the PCP with the MCP using a QR code scanner or RFID or similar techniques. At block 1204, a unique validation key 1206 is received and used to register the PCP. In one or more embodiments, the unique validation key is a combination of the aircraft tail number and registration ID. Next, the method 1200 proceeds to decision block 1208 and determines whether the registration was successful. If not ("No" branch), the method 1200 returns to block 1204. If so ("Yes" branch), the method 1200 proceeds to block 1210 and begins receiving beacon signals from multiple wireless coordinators. At block 1212, the zone in which the PCP is currently located is identified using trilateration techniques. At decision block 1214, it is determined whether another PCP is already registered in the zone. If so ("Yes" branch), the method 1200 proceeds to block 1216 and displays a message to the operator indicates another PCP is controlling the zone and access cannot be gained and returns to block 1210. If not ("No" branch), the method proceeds to the method shown in FIG. 13.

Referring now to FIG. 13, a flow diagram of a method 1300 is provided. The method 1300 begins at decision block 1302 and determines whether a zone conflict exists. If so (yes branch), the method proceeds to decision block 1304 to determine whether the operator confirms the operation. If so ("Yes" branch), the method 1300 releases the current zone and gains access to the other (new) zone and proceeds to block 1306 to register the PCP with the wireless controller in the new zone. If not ("No" branch), the method 1300 continues with the first identified zone and proceeds to block 1308.

If there is no zone conflict ("No" branch), the method 1300 proceeds to block 1308 and registers the PCP with the wireless controller in the identified zone. Next, the method 1300 continues to block 1310 where the registered zone is displayed to the operator. At block 1312, the PCP issues commands to the PDUs/turntables through wireless coordinators in the registered zone and at block 1314, the PDUs/turntables statuses are presented in the PCP display. The method 1300 then proceeds to decision block 1316 and determines if the operator is moving from one zone to the other. If so ("Yes" branch), the method 1300 continues to block 1210 and if not ("No" branch), the method 1300 returns to block 1312.

The technical effects and benefits include controlling ULDs at multiple zones simultaneously through different portable control panels and a reduction in multiple physical control panels and corresponding hard-wired connectivity. This greatly reduces the overall setup cost and the weight on the aircraft. The technical effects and benefits include using the portable device as the control panel and as the cargo monitoring device. The technical effects and benefits also include enhancing the safety of the operator as they can position themselves with more mobility based on the position of the ULDs.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for managing multiple portable control panels in aircraft cargo handling system, the system comprising:
    a master control panel (MCP);
    a plurality of wireless coordinators in communication with the MCP;
    a plurality of zones of a cargo storage area, wherein each zone of the plurality of zones is defined by a portion of the cargo storage area that is controlled by a wireless coordinator of the plurality of wireless coordinators and includes at least one of power drive units (PDU) and turntables; and
    a plurality of portable control panels (PCPs) in communication with the wireless coordinators, the PCPs configured to operate and monitor states of the PDU and turntables, wherein each of the plurality of PCPs comprise a display that is configured to automatically update soft controls available to the PCPs based at least in part on a location in the plurality of zones and is configured to display an orientation of the aircraft, wherein the soft controls include a soft joystick and one or more soft switches, wherein the soft joystick is presented on the display based at least in part on the orientation of an aircraft including the cargo storage area.

2. The system of claim 1, wherein the PCP includes at least one of QR code scanner or radio frequency identifier to perform registering with an aircraft cargo compartment.

3. The system of claim 1, wherein registering with an aircraft cargo compartment comprises using at least one of a QR code or RFID.

4. The system of claim 1, wherein registering with a zone includes a unique key that combines an aircraft tail number and zone identifier.

5. The system of claim 1, wherein the plurality of wireless coordinators are configured to transmit a zone location and time tag.

6. The system of claim 1, wherein PCP comprises a wireless interface to communicate with the wireless coordinators to control each zone.

7. The system of claim 1, wherein the plurality of wireless coordinators are configured to determine a location of the PCP based at least in part on received signal strength indicator (RSSI) based or other trilateration methods.

8. A method of managing multiple portable control panels in aircraft cargo handling system, the method comprising:
    associating a key to perform registration;
    determining a location of the portable control panel (PCP) based on a plurality of wireless coordinators and the key;
    registering a PCP to a zone of a plurality of zones of a cargo storage area based on the plurality of wireless coordinators, wherein each zone of the plurality of zones is defined by a portion of the cargo storage area that is controlled by a wireless coordinator of the plurality of wireless coordinators;
    controlling at least one of power drive units (PDUs) or turntables of the zone; and
    responsive to a zone change, automatically updating soft controls presented on a display of the PCP based at least in part on the zone change, wherein the PCP comprises a display that is configured to automatically update soft controls available to the PCP based at least in part on a location in the plurality of zones and is configured to display an orientation of the aircraft, wherein the soft controls include a soft joystick and one or more soft switches, wherein the soft joystick is presented on the display based at least in part on the orientation of an aircraft including the cargo storage area.

9. The method of claim 8, further comprising detecting, by the plurality of wireless controllers, the movement of the PCP; and
    responsive to the movement, determining at least one of a zone change or a zone conflict.

10. The method of claim 9, further comprising responsive to determining the zone change, performing a detection of other actively engaged PCPs in the zone; and
    completing registration based on at least in part on the detection.

11. The method of claim 10, further comprising responsive to determining a zone conflict, providing a prompt to select a zone; and
    completing the registration based on the selected zone.

12. The method of claim 8, wherein registering the PCP comprises using at least one of a QR code or RFID or similar method.

13. The method of claim 8, wherein the key comprises combines an aircraft tail number and zone identifier.

14. The method of claim 8, further comprising transmitting, by the plurality of wireless coordinators, a zone location and time tag to the PCP.

15. The method of claim 8, wherein determining the location of the PCP is based at least in part on received signal strength indicator (RSSI) based or similar trilateration of the plurality of wireless coordinators.

* * * * *